US009056599B2

(12) United States Patent
Jensen

(10) Patent No.: US 9,056,599 B2
(45) Date of Patent: Jun. 16, 2015

(54) LOCATION ASSISTED MACHINE RETARDING CONTROL SYSTEM

(71) Applicant: Caterpillar Inc., Peoria, IL (US)

(72) Inventor: Jeffrey Edward Jensen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/960,338

(22) Filed: Aug. 6, 2013

(65) Prior Publication Data

US 2015/0046052 A1 Feb. 12, 2015

(51) Int. Cl.
G06F 7/70 (2006.01)
B60T 8/17 (2006.01)

(52) U.S. Cl.
CPC .................................... B60T 8/1701 (2013.01)

(58) Field of Classification Search
USPC ................. 701/70; 188/137; 340/52
See application file for complete search history.

(56) References Cited

U.S. PATENT DOCUMENTS

| 4,282,466 | A | * | 8/1981 | Matty | 318/434 |
| 5,984,435 | A |   | 11/1999 | Tsukamoto et al. | |
| 6,240,356 | B1 | * | 5/2001 | Lapke | 701/93 |
| 6,349,253 | B1 | * | 2/2002 | Bellinger | 701/53 |
| 6,955,157 | B1 | * | 10/2005 | Haskara et al. | 123/406.26 |
| 7,034,476 | B2 | * | 4/2006 | Wang et al. | 318/139 |
| 7,317,975 | B2 | * | 1/2008 | Woolford et al. | 701/29.3 |
| 7,460,941 | B2 | * | 12/2008 | Sychra et al. | 701/50 |
| 7,517,300 | B2 | * | 4/2009 | Landes | 477/77 |
| 7,841,673 | B2 |   | 11/2010 | Szczerba et al. | |
| 7,869,927 | B2 | * | 1/2011 | Uematsu | 701/70 |
| 8,401,753 | B2 | * | 3/2013 | Chappell et al. | 701/65 |
| 2001/0016795 | A1 | * | 8/2001 | Bellinger | 701/53 |
| 2004/0122580 | A1 | * | 6/2004 | Sorrells | 701/80 |
| 2007/0233351 | A1 | * | 10/2007 | Wang | 701/70 |
| 2009/0232668 | A1 |   | 9/2009 | Sabelstrom et al. | |
| 2009/0318263 | A1 | * | 12/2009 | Yuet et al. | 477/92 |
| 2010/0152946 | A1 |   | 6/2010 | Koch | |
| 2012/0109423 | A1 |   | 5/2012 | Pack et al. | |

FOREIGN PATENT DOCUMENTS

KR 20070028486 A 3/2007

* cited by examiner

*Primary Examiner* — Thomas G Black
*Assistant Examiner* — Tyler Paige

(57) ABSTRACT

A retarding control system for a machine is disclosed. The retarding control system may include a locator, configured to sense a location of the machine. Additionally, the retarding control system may include a sensing system configured to sense at least one a parameter indicative of a retarding of the machine. The retarding control system may also include a retarding system configured to retard the machine and a braking system configured for braking the machine. The retarding control system may also have a map configured to store at least one known retarding condition and at least one known retarding location. Further, the retarding control system may include a controller. The controller can be in communication with the locator, the sensing system, the retarding system, the braking system and the map. The controller may be configured to update the map based on the location, and the retarding condition.

5 Claims, 3 Drawing Sheets

LOCATION ASSISTED MACHINE RETARDING CONTROL SYSTEM

TECHNICAL FIELD

The present disclosure relates generally to a retarding control system and in particular to a location assisted retarding control system for an industrial mobile machine.

BACKGROUND

Industrial mobile machines, such as dozers, motor graders, wheel loaders, haul trucks and other types of heavy equipment are used to perform a variety of tasks. Some of these tasks involve traversing road or other worksite surfaces, which may be rendered unpredictable by weather, usage patterns, tectonic shifts, mud slides, rock slides, road repair, natural or man-made obstacles or other deteriorative events, and/or processes. Further, the road surface may include up-hill or down-hill terrain. These conditions require timely retarding of the machine improves operating efficiency of each machine and the industrial operation of the worksite. Timely retarding of mobile machines on a worksite also prevents any accident or any unwanted machine or engine damage e.g. due to over-speeding of the engine during down-hill movement or during negotiating a sharp bend on the road. Machines can traverse these road or other worksite surfaces with operator control. For example, an operator of the machine may engage a retarding system or apply the brakes to control the speed or completely stop the machine in anticipation of or in response to road or other worksite surface conditions.

Machines are, however, becoming increasingly automated. An automated retarding control system controls the retarding of the machine based on various conditions, for example, engine speed conditions such as over-speeding of the machine, a gear selection of the machine, a slip condition of the machine etc. Therefore, the automated retarding control system initiates retardation or applies brakes reactively. In other words, the automated retarding control system starts retarding the machine once the machine control parameters are near or above threshold values. Therefore, the present automated retarding control system may not start braking in a timely or efficient manner.

The present disclosure is directed toward one or more of the problems set forth above.

SUMMARY

The disclosed idea relates to a location assisted retarding control system for a machine. The system includes a locator. The locator can be configured to sense a location of the machine. Further, the retarding control system includes a sensing system. The sensing system can be configured to sense one or more parameters indicative of retarding of the machine. Furthermore, the retarding control system includes a map. The map can be configured to store at least one known retarding location. Moreover, the retarding control system includes a controller. The controller can be in communication with the locator, the sensing system, and the map. The controller can be configured to update the map based on the location, and one or more parameters.

In another aspect, a method for operating a location assisted retarding control system in a worksite is provided. The method includes monitoring a location and retarding condition of a first machine in the worksite. The method further includes storing the retarding condition and the location of the first machine to a map. The map can be configured to store a retarding condition and a location. Further, the method includes communicating the stored retarding condition and the location of the first machine to a second machine traversing through the location in the worksite. Furthermore, the method includes updating the map based on retarding condition of the second machine at the location in the worksite. Further, the method may include alerting the operator to a pending retarding condition and the degree of retarding based on the updated map.

DETAILED DESCRIPTION

Figure 1:
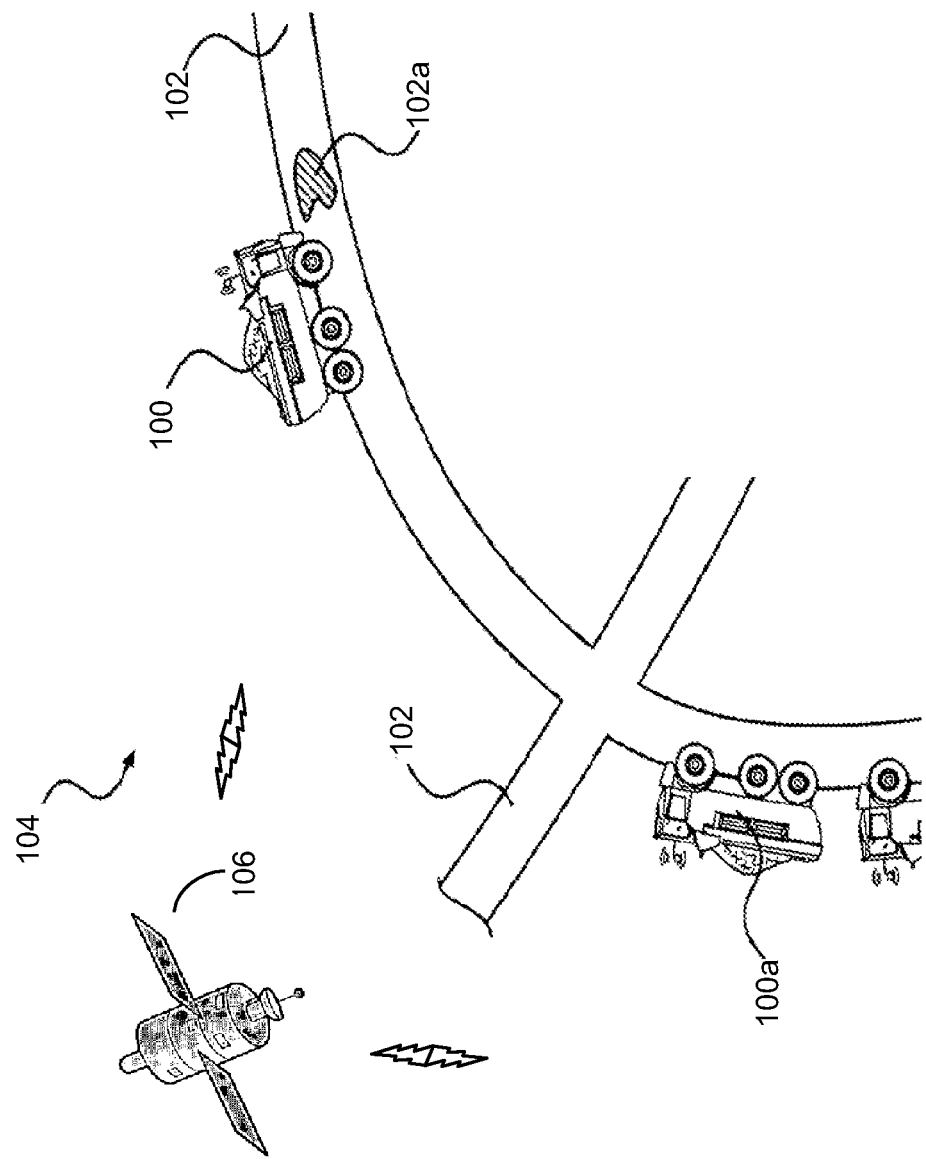
FIG. 1 is an illustration of an exemplary machine at an exemplary worksite.

FIG. 1 illustrates an exemplary machine 100 moving along a path 102 of a worksite 104. The machine 100 can be an autonomous, semi-autonomous, and/or manned mobile machine that can perform various operations such as mining, construction, farming, grading, dozing, quarry, landfill compacting, forestry, or other work. Although the autonomous machine may be designed to operate without an operator, it should be understood that autonomous machines may or may not be designed to operate with an operator. In both cases, the machine 100 may be, for example, an on- or off-highway haul truck or another type of equipment that may haul material. In one embodiment, the machine 100 may be a motor grader, an excavator, a dozer, a haul truck, a water truck, a wheel loader, a tracked loader, a compactor, a scraper, or another type of mobile machine. The worksite 104 may be, for example, a mine site, a landfill, a quarry, a construction site, a logging site, a road worksite, or another type of worksite known in the art. The worksite 104 may include one or more machines working. For example, the worksite 104 is shown to include a first machine 100 and a second machine 100a (hereinafter referred to as another machine 100a). The first machine 100 and the second machine 100a may communicate with each other through a wired or a wireless communication channel such as through a satellite 106. The worksite 104 may also have various terrain features, for example, obstacles, inclination (uphill or downhill), or sharp bends along the path 102. These features in the worksite can cause the machine 100 and/or another machine 100a to retard or slow down. As used herein, the retarding condition of the machine 100 is an event that causes or requires retarding/braking of the machine 100. For example, the machine 100 may pass through a bend 102a along the path 102, or descend a steep hill, which require retarding the machine via a retarding system or by application of brakes or utilizing both systems together to retard/brake. For example, at a curve the retarding system may selectively increase the natural resistance of engine to motion and/or provide additional retarding torque to the engine to retard the machine 100. In one embodiment, the retarding system may embody an engine brake or an exhaust brake. It is further contemplated that the engine retarding system may be hydraulically operated, mechanically operated, electrically operated, pneumatically operated, or operated in any other suitable manner. Further, the braking system may be configured to assist in retarding the motion of machine 100 and may be operably associated with each wheel of vehicle machine.

In one embodiment, the braking system may be a hydraulic pressure-actuated wheel brake such as, for example a disk brake or a drum brake disposed intermediate wheel and a drive assembly. It is contemplated that the brake mechanism may alternatively embody another non-hydraulic type of wheel brake such as an electric motor or any other similar mechanism known in the art. Hence, such an event, where an operator applies brakes or takes measures to retard the machine 100, can be termed as retarding condition. The retarding condition or retarding event can include information regarding the proportion of the utilization of the retarding system to retard the machine 100 and the proportion of the utilization of the braking system to retarding the machine 100 from the beginning of the retarding condition to the ending of the retarding condition.

In general, the operator of the machine 100 can manually retard the machine 100 by engaging the retarding system and/or applying the brakes though braking system. For example, the operator can depress a retarding system switch on the floor of the machine to engage the retarding system of the machine 100, depress a brake pedal to apply the brakes, or the operator can both depress the retarding switch on the floor and the brake pedal to activate the retarding system and simultaneously apply the brakes to increase the retarding of the machine. In another embodiment, an automated retarding system can be activated by the machine 100.

Figure 2:
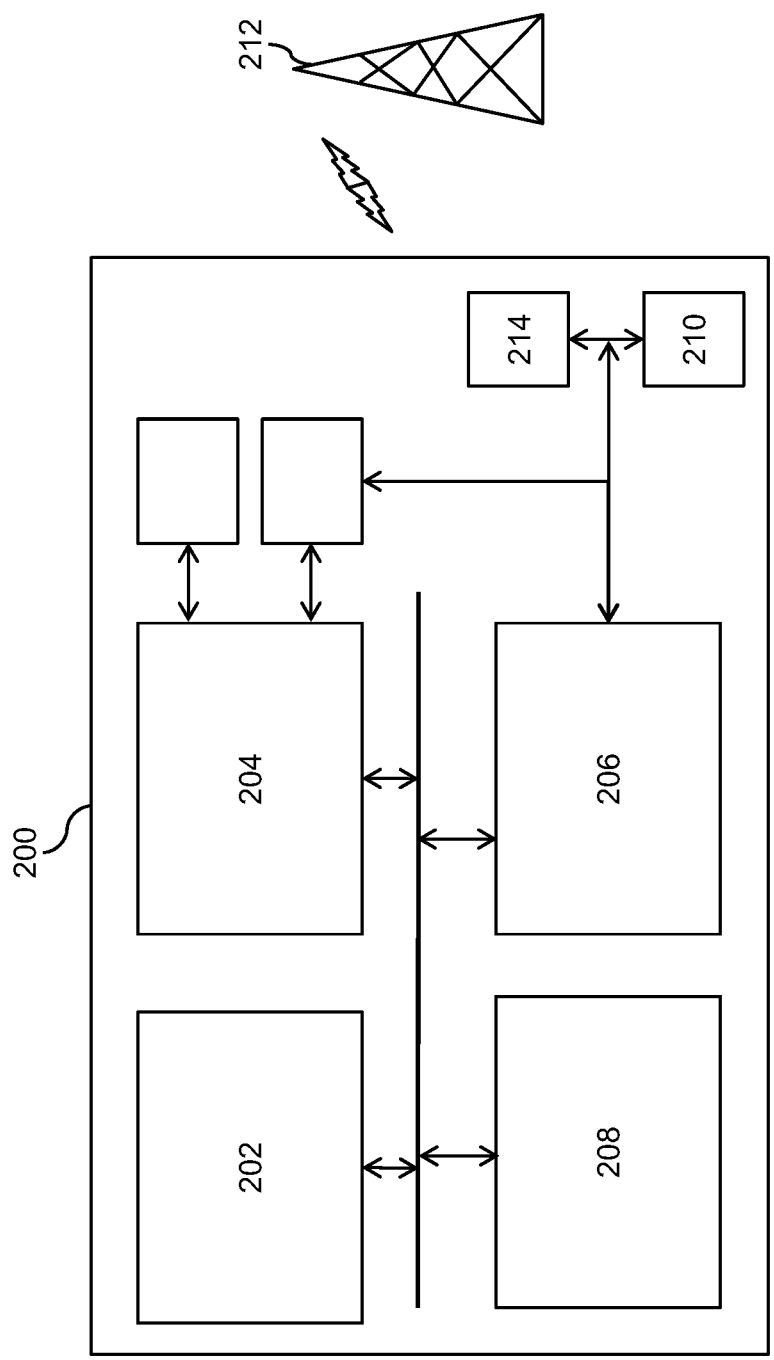
FIG. 2 is an illustration of an exemplary location assisted machine retarding control system.

FIG. 2 is an illustration of an exemplary location assisted machine retarding control system 200 for the machine 100. The retarding control system 200 can be configured to control the retarding/braking of the machine 100. As illustrated in FIG. 2, the retarding control system 200 includes a locator 202, a sensing system 204, a controller 206, and a map 208. The locator 202, the sensing system 204, the controller 206, and the map 208 are in communication with each other.

The locator 202 can be configured to determine the location of the machine 100. In other words, the locator 202 can determine the direction and position/location of the machine 100 in the worksite 104. In one embodiment, the locator 202 can determine the location of the machine through a satellite-based positioning system. For example, the locator 202 can be a positioning system, such as the Global Positioning System (GPS) and/or an inertial measurement unit (IMU), or a perception-based localization system using, for example, Light Detection and Ranging (LIDAR). In other words, the locator 202 can determine the current location of the machine 100 in the worksite 104. In another embodiment, the locator 202 can also be a coordinate system associated with the worksite 104, a coordinate system associated with Earth, or another type of coordinate system. For example, the locator 202 may determine the location of the machine 100 relative to a fixed coordinate system.

In one embodiment, the locator 202 can receive and analyze radio or laser signals from multiple locations to triangulate a relative location. For example, locator 202 may include an electronic transceiver configured to communicate with one or more satellites, or a local radio or laser transmitting system to determine a relative 3-D location of the machine 100. Alternatively or additionally, the locator 202 may include an inertial reference unit (IRU), an odometric or dead-reckoning positioning device, or another known locating device operable to receive or determine the relative 3-D location of the machine 100 with respect to the worksite 104.

The retarding control system 200 may also include the sensing system 204. The sensing system 204 senses the retarding condition of the machine 100 based on the one or more parameters indicative of the retarding. The retarding condition of machine 100 may be indicated by one or more parameter, such as wheel speed, rate of change of machine speed, de-acceleration of the machine, depression of a brake pedal, transmission speed, ground speed, brake pressure, hydraulic pressure, air pressure, coolant temperature, etc. Further, the machine 100 can include one or more sensors such as a wheel speed sensor, an acceleration sensor, a brake pedal sensor, a wheel slip sensor, and an inertial sensor to detect the one or more parameters indicative of the retarding/braking condition of the machine 100. For example, a wheel speed sensor can be configured to detect the deceleration of the wheel speed and hence indicating a retarding condition. Thus, the sensing system 204 senses the retarding condition based on the one or more parameter. In one embodiment, the sensing system 204 can be a microprocessor-based controller configured to receive signals from the one or more sensors. The one or more sensors can detect various parameters or data indicative of retarding. For example, the machine 100 can be a mine truck with a fuel rate sensor. The fuel rate sensor can sense a decrease in fuel rate, and send a signal to the sensing system 204. Decrease in fuel rate can correspond to retarding of the machine 100. Hence, the sensing system 204 comprehends the received signal and, and thereby indicates a retarding condition. In another embodiment, a brake switch sensor can detect when the operator depresses the brake pedal. Hence, depressing the brake pedal can be considered a retarding condition by the sensing system 204.

Further, the retarding control system 200 may include the controller 206. The controller 206 can be configured to communicate with the locator 202 to monitor the location of the machine 100. In one embodiment, the locator 202 may generate and communicate to the controller 206 a signal indicative of the location of machine 100, hereafter the 'location of machine'. Further, the controller 206 may also be configured to communicate with the sensing system 204 to monitor the one or more parameter indicative of the retarding condition of the machine 100. Based on the communication with the locator 202 and/or the sensing system 204, the controller 206 may determine the location of the machine 100 corresponding to the retarding/braking condition. In other words, the controller can identify the corresponding retarding location. The retarding location can include information of the starting and ending location of retarding condition, and the path traveled during which the machine 100 experienced the retarding condition. Thus, the controller 206 can be said to determine a retarding condition and a retarding location. Further, the controller 206 can communicate with a map 208. The map 208 can be configured to store the retarding condition and the retarding location of the machine 100. In one embodiment, the map 208 can be a data repository, a data table, a matrix, a chart, a graphical user interface, or any other storage format know in the art that can be used to store and retrieve data. In one embodiment, the map 208 may be electronic in form and can be stored in the memory (not shown) of controller 206. The map 208 may also serve as a lookup table for at least one known retarding condition and at least one known retarding location. In other words, at least one known retarding condition and at least one know retarding location may be a retarding condition and retarding location, respectively, that are already stored in map 208. Additionally, the map 208 may be updated with the retarding condition and the retarding locations each time the machine 100 experiences a retarding condition while traversing through the path 102.

In another embodiment, the controller 206 can communicate with a transmitter 210 to transmit the retarding condition and the retarding location where machine 100 experienced retarding to an offboard system or a memory of another machine 100a. For example, the offboard system may include a worksite base station 212. In this embodiment, the offboard system may include a memory or a map similar to the map 208. In another embodiment, the map 208 may be updated by the controller 206, a controller of another machine 100a, a controller of worksite base station 212, or another component capable of updating the map 208. This updating may be direct or by way of communication among the machine 100, another machine 100a, and/or the worksite base station 212. The updating may include adding a retarding condition and the retarding locations to or removing the at least one known retarding condition and the at least one know retarding location from the map 208. In other words, the at least one known retarding condition and the at least one know retarding locations on the map 208 can be updated each time the machine 100 or another machine 100a passes the location on the map 208. Also, an already stored retarding condition and/or retarding location may be erased from the map 208. For example, the controller 206 may update the retarding condition and the retarding location when the machine 100 passes a particular location on the worksite 104. Similarly, the controller of another machine 100a may overwrite the retarding condition and the retarding location updated by the machine 100, when the another machine 100a passes the same location on the map 208. Hence, the retarding condition and the retarding location may be overwritten multiple times, hence updated on the map 208. In an alternate mode, an average value of retarding condition and the retarding location can be updated in the map 208 by the machine 100 and another machine 100a. For example, machine 100 may communicate a beginning location for retarding 20 meters before the bend 102a. Also, another machine 100a may communicate a beginning location for retarding 22 meters before the bend 102a. In this exemplary embodiment, the controller may update the map 208 with 21 meters as the beginning location for retarding before the bend 102a. In another example, machine 100 may also communicate a retarding condition parameter that is the degree of the total retarding power used to retard the machine or a retarding condition value that is the proportion of retarding system power versus braking system power, and another machine 100a may communicate a retarding condition with a different degree of total retarding power or a different proportion of retarding system power versus braking system power. In an exemplary embodiment, the map 208 may be updated with a retarding condition value for retarding power or retarding condition value for the proportion of retarding system power versus braking system power that is the average of the values for machine 100 and machine 100a at a specific location on the worksite 104.

In one embodiment, the controller 206 may also communicate with a receiver 214 to receive, from the off-board system, at least one know retarding condition and at least one know retarding location that is already stored in the map 208. For example, the at least one known retarding condition and the at least one known retarding location may be a location where the operator of another machine 100a engaged exhaust braking and also applied brakes. Thus the at least one known retarding condition and the at least one know retarding location may already be stored in the map of the offboard system. Hence, the controller 206 may communicate with the receiver 214 to receive the at least one known retarding condition and the at least one known retarding location from the offboard system. Therefore, based on communication with the locator 202 and the map 208, the controller 206 may react to the at least one known retarding condition and the at least one known retarding locations. Hence, for a manually operated machine, the controller 206 may alert an operator of the machine 100 of the retarding condition and the retarding location. Thereafter, the operator may retard the machine by engaging a retarding system 216. In embodiment, the operator may also apply brakes though the braking system 218. In this embodiment, the controller 206 may receive information on when to initiate the retarding and the degree of retarding required. Such as, the controller 206 may determine the initiation and the degree of retarding based on the proportion of the utilization of the retarding system to retard the machine and the proportion of the utilization of the braking system to retarding the machine from the beginning to the ending location of the retarding condition. In another mode, the controller 206 may autonomously control the machine 100. For example, the controller 206 can command the retarding system 216 and/or the braking system 218 of the machine 100 to retard and/or brake based on the at least one known retarding condition and the at least one known retarding location. In either case, the controller 206 can update the map 208 with the retarding condition and the retarding location. However, as per the operator, if the retarding condition does not exist at the location, the operator may not retard the machine and/or applying the brakes. However, the controller 206 may still update the map 208 accordingly and remove the retarding condition and the retarding location in the map 208. It can be contemplated that previously, the machine 100 might have retarded because of the presence of a temporary retarding condition, for example, an obstacle along the machine's path, a slippery surface due to the rain, a water truck, stalling of a machine traveling ahead of it, etc. Hence, the retarding control system 200 can proactively retards the machine 100 based on the location and a previous pattern or at least one known retarding condition and at least one known retarding location, and continually updates the retarding condition and the retarding location.

Figure 3:
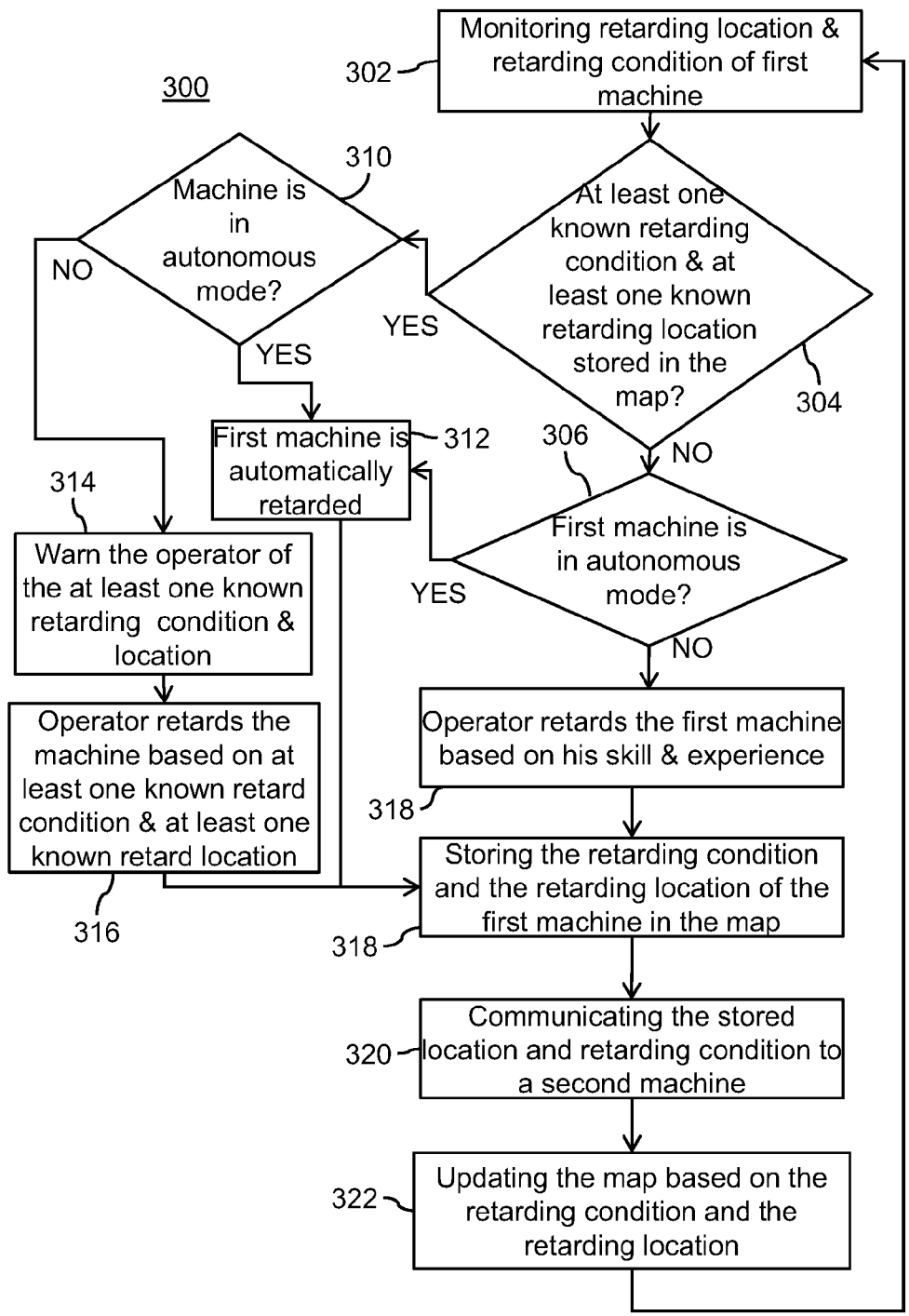
FIG. 3 is a flow chart illustrating the method for operating a location assisted retarding control system in a worksite.

FIG. 3. shows a flow chart 300 illustrating a method for operating a location assisted retarding control system 200 in the worksite 104. FIG. 3. is described in the following section to further illustrate the operating method of the retarding control system 200.

INDUSTRIAL APPLICABILITY

The present disclosure applies generally to mobile machines and is specifically applicable to mobile machines operating on the worksite 104. As illustrated in FIG. 3., the machine 100 may be a haul truck traversing through the path 102 of the worksite 104. At step 302, the location of the machine 100 is monitored by the locator 202 of the retarding control system 200. For example, a manually operated first machine 100 can travel from a loading zone to a dump location. During its path of travel, the first machine 100 may pass through a bend 102a. At this location, the operator may be required to retard the machine 100. The locator monitors the location of the machine at the bend 102a. At step 304, the controller 206 checks if the at least one known retarding condition and the at least one known retarding location corresponding to the bend 102a is stored in the map 208. Further, at step 306, the controller 206 checks if the machine is in autonomous mode, when the at least one known retard condition and the at least one known retard location is not stored in the map. Hence, if the controller 206 cannot find an already stored retard condition and retard location corresponding to the bend 102a. The controller 206, checks if machine 100 is an autonomous machine. Thereafter, at step 308, the operator retards the machine 100 based on his skill and experience. In other words, if the machine is not autonomous and also at least one known retarding condition and the at least one known retarding location is not stored in the map, the operator retards the machine based on his experience and skill. However, at step 310 also, the controller 206, checks if the machine is in autonomous mode, when the at least one known retarding condition and the at least one known retarding location is already stored in the map 208. Thereafter, at step 312, the machine 100 is automatically retarded when the machine is in automated mode. Whereas, at step 314, the operator of first machine 100 is warned about the retarding condition corresponding to the bend 102a when machine 100 is not in autonomous mode, and the at least one known retarding condition and the at least one known retarding location is available in the map 208. For example, the controller 206 may continually monitor a location of the machine 100. Also the controller may check the map 208 to identify if the at least one known retarding condition, such as the wheel speed, or the at least one known retarding location such as beginning location at which the operator may initiate retarding at the bend 102a, is already stored in the map 208. It may be noted that the wheel speed and the beginning location at which the operator may start retarding can be based on the retarding condition and the retarding location updated by a machine that has already passed the bend 102a. Further, at step 316, the operator retards the machine based on the at least one know retarding condition and the at least one known retarding location. However, the operator may also choose to override the alert based on the already known retard condition and the retard location. In both events, the controller 206 monitors the retarding condition and the retarding location of the machine 100. For example, the controller 206 may monitor the location and the duration for which the operator depressed the brake pedal. This information for retarding condition and the location of the machine 100 is thereafter stored in the map 208 at step 318. Furthermore, at step 320, the retarding condition and the retarding location of the machine 100 can be communicated to a second machine 100a that may pass the bend 102a in future. The second machine 100a may similarly follow or disregard the retarding condition location communicated by the machine 100. Further, at step 322, the map 208 is also updated with the retarding condition and the retarding location as determined by the locator 202 and the controller 206 respectively. Thereafter, the retarding location of the machine 100 can continually be monitored by the locator 202 and accordingly updated to the map 208 by the controller 206. Hence, the provided system 200 proactively retards the machine 100 by providing retarding location and the retarding location based on previous patterns.

What is claimed is:

1. A location assisted machine retarding control system for a machine, comprising:
   a locator, configured to sense a location of the machine;
   a sensing system configured to sense one or more parameters indicative of a retarding condition of the machine;
   a retarding system configured to retard the machine;
   a braking system configured for braking the machine;
   a map configured to store at least one known retarding condition and at least one known retarding location, and
   a controller, in communication with the locator, the sensing system, the retarding system, the braking system, and the map, configured to update the map based on the location, and the retarding condition,
   wherein the controller alerts an operator of the machine of the at least one known retarding location and the at least one known retarding condition stored on the map.

2. The location assisted machine retarding control system of claim 1, wherein the sensing system determines a proportional degree of retarding of the retarding system and braking of the braking system at the location.

3. The location assisted machine retarding control system of claim 1, wherein the controller indicates to the operator, the proportional degree of retarding of the retarding system and braking of the braking system of the machine at the at least one known retarding location stored on the map.

4. A method for operating a location assisted retarding control system in a worksite, comprising:
   monitoring a retarding location and retarding condition of a first machine in the worksite;
   storing at least one known retarding condition and at least one known retarding location to a map;
   communicating the retarding condition and the retarding location of the first machine to the map and a second machine in the worksite; and
   updating the map based on the retarding condition and the retarding location of the second machine, while traversing through the location in the worksite.

5. The method of claim 4, wherein an operator of a first machine is alerted of the at least one known retarding condition and the at least one known retarding location stored in the map.

* * * * *